Patented May 5, 1953

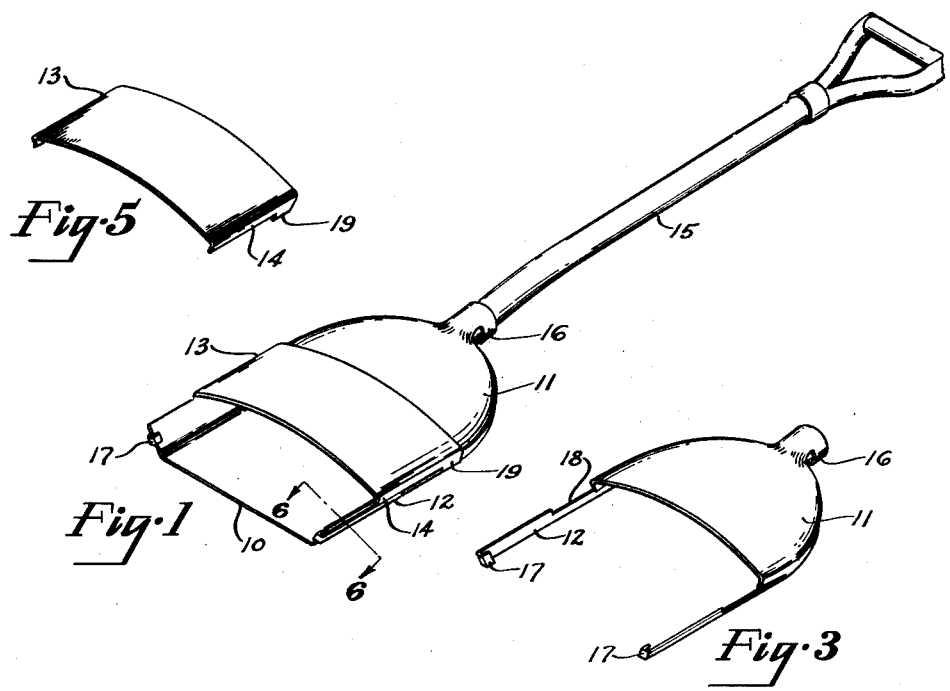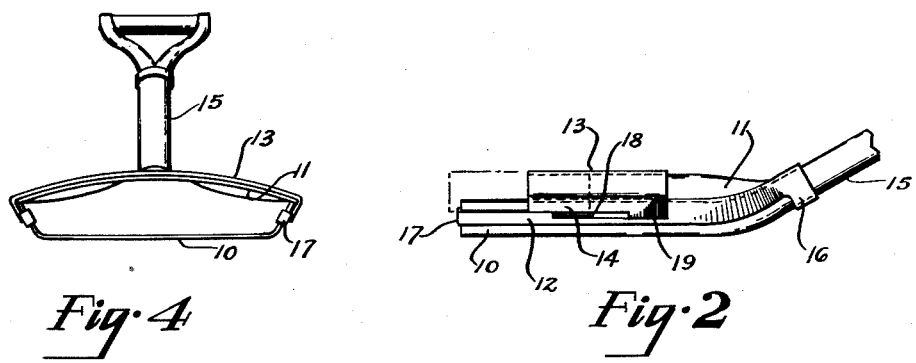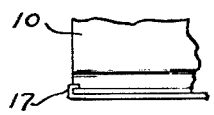
INVENTOR.
JOAN BURKE

2,637,588

UNITED STATES PATENT OFFICE 2,637,588

DUSTLESS ASH SCOOP

Joan Burke, East Cleveland, Ohio,

Application May 6, 1948, Serial No. 25,507

1 Claim. (Cl. 294—55)

This invention relates to a dustless ash scoop or shovel.

An object of the invention is to provide a device applicable as a cover for a scoop or shovel so that ashes or other dusty materials may be moved and deposited without spilling or scattering and without raising any dust.

Reference to the following description and to the accompanying drawing will show the convenience in using the device as well as the manner of its operation. In the drawings:

Fig. 1 is a perspective view of the device in place on a shovel;

Fig. 2 is a side elevational view of the cover device and shovel shown in Fig. 1;

Fig. 3 is a perspective view of the cover device but without its sliding part hereafter described;

Fig. 4 is a front end view of the shovel with the cover device thereon;

Fig. 5 is a perspective view of the sliding or movable part of the device; and

Fig. 6 shows the inturned front end flanges used for holding the cover device to the shovel body.

Referring to the drawing, a standard form scoop shovel 10 is shown provided with a cover device comprising a fixed part 11 which fits over the shovel body and is prevented from sliding upwardly off of the shovel blade because sides 12 of the fixed part 11 are inclined toward each other to fit tightly against the inclined shovel sides.

In accordance with the invention the cover fixed part 11 carries a sliding part 13, the two parts together constituting the complete device sometimes hereafter referred to as "the device." The sides 14 of sliding part 13 are also inclined toward each other to prevent this member 13 from slipping off the member 11.

Shovel 10 has a handle portion 15 and the cover member 11 is provided with a portion 16 adapted to fit around the handle. At the front end the cover sides 12 terminate in turned-in front end flanges 17 which, with portion 16, maintain the device in a fixed and proper position on the shovel. A portion of the fixed cover sides 12 are notched out at 18, and the sliding portion sides 14 are provided with projections 19 inclined inwardly to travel in these notches 18 and limit forward and backward motion of the sliding member 13. The position of the sliding member as shown in Fig. 1 permits the shovel to be filled, and its position as indicated in dashed lines at the left end of Fig. 2 permits the contents of the shovel to be emptied without danger of spilling any of the contents, and without raising dust.

If desired, the part 16 may be split or otherwise so made that the cover device can be slid over the shovel until the turned-in ends 17 engage the front ends of the shovel sides, and the portion 16 adapted to fit around the handle then fashioned thereabout to clamp the handle as shown.

It will be observed that when the slide 13 is forward (to the left in Fig. 2) the device extends over the entire top of the shovel. When the shovel is to be filled, slide 13 may be slid toward the handle either by the user or by reason of resistance of the material into which the shovel is being forced for the purpose of filling it. When the shovel is filled, the sliding part 13 is slid forward, manually or automatically as the shovel is raised clear of the material into which it has been forced.

From the above it will be apparent that I have invented a new and novel, simple and inexpensive, device for which there is much need. While I have shown the device in a particular form, adaptations may necessitate modifications which do not depart from the basic features of the invention or the scope of the appended claim.

Having described this invention and the manner of using same, I claim:

A device of the character described comprising a cover of convex form with means for attaching securely over and to the body of a scoop shovel, said cover consisting of a base part with the edge portions of its parallel sides inclined downwardly and slightly inward, said base part extending across said shovel body and attached on and over the sides of the shovel body by means of the said inclined edges, said base part also further attached to said shovel body by means of an extending portion clamping around the handle of the shovel, a part attached on the foreward portion of the base part by slidable means, and said slidable part when in its forward position forming with the base part a complete cover for the top of the said shovel body.

JOAN BURKE.

References Cited in the file of this patent

UNITED STATES PATENTS

| Number | Name | Date |
|---|---|---|
| 133,320 | Kyle | Nov. 26, 1872 |
| 956,961 | Hammerschmidt | May 3, 1910 |
| 2,357,114 | Howe | Aug. 29, 1944 |

FOREIGN PATENTS

| Number | Country | Date |
|---|---|---|
| 319,484 | Germany | Sept. 26, 1918 |
| 143,042 | Great Britain | May 20, 1920 |
| 249,674 | Great Britain | Apr. 1, 1926 |